May 3, 1966 D. A. ZELLER, JR 3,249,767

SYNCHRONIZED SWITCHING MONOSTABLE MULTIVIBRATOR

Filed Aug. 23, 1963 2 Sheets-Sheet 1

INVENTOR.
DAVID A. ZELLER, JR.

BY Kenyon & Kenyon

ATTORNEYS

May 3, 1966 D. A. ZELLER, JR 3,249,767

SYNCHRONIZED SWITCHING MONOSTABLE MULTIVIBRATOR

Filed Aug. 23, 1963 2 Sheets-Sheet 2

INVENTOR.
DAVID A. ZELLER, JR.

BY Kenyon & Kenyon
ATTORNEYS

United States Patent Office 3,249,767
Patented May 3, 1966

3,249,767

SYNCHRONIZED SWITCHING MONOSTABLE MULTIVIBRATOR

David A. Zeller, Jr., Brookfield, Conn., assignor to Data-Control Systems, Inc., Danbury, Conn., a corporation of Delaware Filed Aug. 23, 1963, Ser. No. 304,164
7 Claims. (Cl. 307—88.5)

This invention applies in general to monostable multivibrators and more particularly to an entirely new monostable multivibrator circuit design which by placing the timing capacitor between the emitters of the switching transistors achieves the potential for higher frequency operation as well as improved and faster switching.

Monostable multivibrators are well known in the art and have a wide variety of uses. The monostable multivibrator typically provides a constant width pulse in response to some input or triggering pulse. Thus, the monostable multivibrator may be used to open a gate where the time period during which the gate is to remain open is somewhat critical, or the monostable multivibrator may be used to provide a linear relationship between input frequency (input pulse repetition rate) and output D.C. voltage (the output D.C. voltage being obtained from an averaging of the constant width output pulses).

An RC time constant is typically used to determine the unstable period of the multivibrator operation and, accordingly, the output pulse width. The frequency limitations in the typical prior art monostable multivibrator arise from the fact that the timing capacitor is driven from a high impedance source; such as when connected to the collector of one of the switching transistors or to the plate of a vacuum tube. Consequently, the timing capacitor, stray capacitance and high impedance result in relatively large RC time constant rise times during valve turnoff. This relatively long rise time limits the frequency at which the generated pulse is sufficiently square for a specific requirement.

Accordingly, it is a major purpose of this invention to provide a monostable multivibrator circuit design which will permit operation at frequencies substantially higher than are permitted by presently available circuit designs.

It is a further object of this invention to provide a new monostable multivibrator circuit design with improved and faster switching time characteristics.

It is a more specific purpose of this invention to provide a monostable multivibrator design wherein the timing capacitor is removed from the high impedance output elements of the switching valves.

As will become apparent from the detailed description, it is also a purpose of this invention to provide a new monostable multivibrator circuit design which will permit duty cycle modulation of the output pulses by a plurality of signals other than the triggering signal.

Briefly, one embodiment of the monostable multivibrator of this invention involves placing the timing capacitor directly between the two emitters of the two switching transistors. With the appropriate design around this fundamental novel point, a monostable multivibrator may be created which will operate at frequencies on an order of magnitude higher than those hitherto available and which will provide for very fast switching time as the circuit switches from the unstable state to the stable state.

This timing capacitor, being connected to the emitters of the two switching transistors has its alternate sides alternately pulled to the base voltage of whichever of the two transistors is on. Arrangements are made whereby these two base voltages are clamped resulting in the capacitor receiving a charge at the time of switching. In order to remove this charge when the circuit is returned to the stable state, so that the circuit will appropriately refire, a means is provided for pulsing the timing capacitor to remove the charge on it. The purpose of removing the charge on the timing capacitor is to return the emitter of the normally off transistor to a voltage which will permit the circuit to refire at the appropriate input triggering voltage level.

In this fashion, the timing capacitor is removed from the high impedance collector so that it does not contribute to the RC time constant rise time and is also driven so as to be negligible in resetting time. Thus, the shape of the output pulses are only dependent upon stray capacitance RC rise times and can be made sufficiently square for any particular requirement at a much higher frequency than was available in the prior art designs.

Furthermore, it should be noted that when a multivibrator is to be used over a wide band of frequencies, in which many different values of timing capacitors are used, the valve output impedances must be selected to properly match the lowest frequency and largest capacitor used. With the timing capacitor removed from the high impedance output element (the transistor collector in this case) the output impedances necessary may be greatly reduced so that the resistor portion of the RC rise times is decreased, thereby further increasing the frequency where sufficient squareness is attained.

Other objects and purposes of this invention will become apparent from a consideration of the following detailed description and drawings, in which.

*Concerning terminology*

Throughout this application, it should be understood that a reference to an increase in voltage or to a decrease in voltage does not necessarily refer to absolute magnitude but takes into account the sign of the voltage involved. Thus a statement that the base of the transistor Q2 moves negative by 15 volts means that the Q2 base goes from a more positive to a less positive value. To say that the base of the transistor Q2 goes from a more positive to a less positive value may include passing through ground as from going from a positive value to a negative value. Indeed, consistent with this convention, a point that goes from, let us say, minus 5 volts to minus 20 volts would be considered as going from a more positive to a less positive value and would be considered as having dropped 15 volts.

In the discussion and claims herein, it will be considered that the triggering input signal is not appropriately referred to as a modulating signal. It is true that the output is a series of square pulses which have a repetition rate that is a function of the repetition rate of the triggering input pulses and thus the triggering input signal is broadly speaking a modulating signal. However, as there is no carrier which can be identified apart from the output pulses, each one of which is triggered by an input pulse, it will be considered herein that the term modulation does not have application to this kind of functional relationship. The signal supplied by the secondary inputs, such as $E_m$ in FIG. 1, will be termed modulating signals since they do affect the duty cycle of the output pulses and thus modulate the output signal. In the application and claims, the main signal ($E_p$ in FIG. 1) without which there would not be an output pulse will be referred to as the triggering signal or triggering pulse while the other signals which affect the duty cycle of the output pulses but which are not sufficient to cause an output pulse will be referred to as modulating signals.

*The first embodiment*

Figure 1:
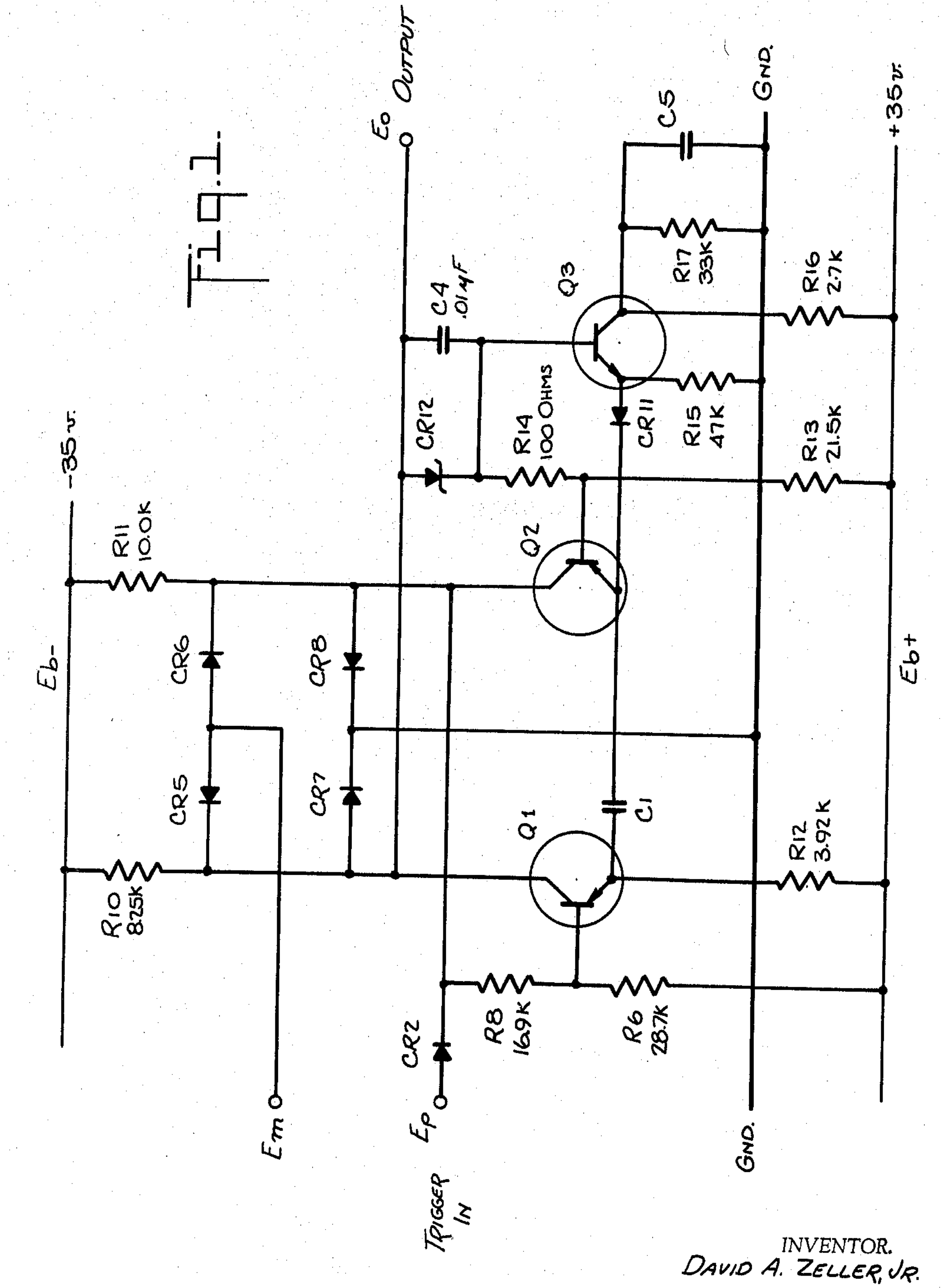
FIG. 1 is a schematic diagram of an embodiment of this invention involving one modulating input; that is an input which will modulate the output in addition to the triggering input.

FIG. 1 represents the simpler of the two embodiments illustrated. However, since the two embodiments are basically similar in operation, parallel terminology will be used throughout. The following discussion of FIG. 1 will substantially apply to the FIG. 2 embodiment.

In the monostable or quiescent state the transistor Q1 is on while the transistor Q2 is off. The resistor series R11, R8 and R6 operate as a voltage divider between the negative bus bar $E_b-$ and the positive bus bar $E_b+$ to provide the required negative bias on the base of the PNP transistor Q1. The emitter of Q1 being connected, through R12, to the positive line $E_b+$ will normally be sufficiently positive relative to the base so that Q1 will conduct. The circuit parameters are selected so that Q1 is hard on.

The resistor R10 is selected so that when Q1 is on, the drop across R10 is such that it tends to make the Q1 collector somewhat more positive than ground. However, the operation of the CR7 diode pegs the Q1 collector substantially to ground while Q1 is on.

Concurrently, in this stable state, the transistor Q2 is off. A back current flows through the Zener diode CR12 from the positive bus bar to ground (from $E_b+$ through R13, R14, CR12, CR7 to ground). This Zener diode CR12 having a 15 volt back drop across it accordingly provides a substantially 15 volt positive bias on the base of the transistor Q2, and this bias is sufficient to maintain the PNP transistor Q2 completely cut off.

When a positive pulse of the appropriate magnitude is supplied at the trigger input, that pulse $E_p$ is coupled to the base of the PNP transistor Q1 through the resistor R8 thereby tending to turn Q1 off. As Q1 turns off, the current through R10 drops thereby dropping the potential on the Q1 collector from a substantially ground voltage to a negative voltage. This negative drop is coupled to the base of transistor Q2 through the Zener diode CR12 and the resistor R14 thereby tending to turn the transistor Q2 on. Actually, the collector of Q1 goes to a predetermined negative voltage which is determined by the input modulating signal $E_m$ and the diode CR5. This predetermined value is made sufficiently negative so that Q2 is turned hard on.

As explained above, the resistor R10 is selected so that when Q1 is on, the drop across R10 tends to make the Q1 collector somewhat positive and accordingly the CR7 diode is effective to peg the collector of Q1 to ground when Q1 is on.

By contrast, when Q1 is off, the voltage drop across the resistor R10 portion of the voltage divider formed by R10, CR12, R14 and R13, is such as to tend to make the collector of Q1 more negative than the minus 15 volts which is applied by the modulation input $E_m$. Thus, when the transistor Q1 is off, the diode CR5 operates to peg the collector of Q1 at the $E_m$ voltage.

Since the base of the transistor Q2 is connected to the collector of Q1 through the small 100 ohm resistor R14 and the Zener diode CR12, the sudden voltage drop from ground to $E_m$ as Q1 turns off is reflected as a comparable voltage drop on the base of the transistor Q2.

This voltage drop (of nearly 15 volts in this embodiment) on the base of the PNP transistor Q2 overcomes the nearly plus 15 volts established by the CR12 Zener diode and thus turns Q2 on. With Q2 on, the emitter of Q2 follows its base and drops negative by a comparable amount. The emitter of Q1 being coupled to the emitter of Q2 through the capacitor C1, accordingly drops the same amount.

Since, immediately prior to the emitter of Q1 dropping by the magnitude $E_m$, the base of Q1 had been turned sharply positive by the input triggering voltage $E_p$, Q1 is turned hard off. It should be noted that both sides of the capacitor C1 have jumped negative by approximately 15 volts with this switch to the unstable state.

With Q1 thus turned off, all the current that flows through R12 must flow through C1. However, the transistor Q2 is on so that both its emitter and its base have their voltage pegged by $E_m$ as described above. Accordingly, the Q2 side of C1 cannot move. Thus all that can happen is that the Q1 side of C1 will charge positively (it being connected to the positive bus bar $E_b+$ through R12) until the emitter of Q1 rises to the base voltage of Q1. As the emitter of Q1 goes more positive than the base of Q1, the transistor Q1, being a PNP transistor, tends to turn on. Because of the cross coupling between the transistors Q1 and Q2, the multivibrator thereby switches to its monostable state.

As the transistor Q1 turns on, its collector rises towards ground by substantially $E_m$ volts (the connection to ground through the diode CR7 holds the collector of Q1 at ground when Q1 is on). The $E_m$ rise on the collector of Q1 is coupled to the base of the transistor Q2 through the Zener diode CR12 and the resistor R14 so that the base of Q2 goes positive by nearly $E_m$ volts tending to turn Q2 off. As Q2 turns off, its collector drops negative and this drop is coupled to the base of the transistor Q1 through the resistor R8 thus turning the transistor Q1 harder on.

Since the emitter of the transistor Q1 will follow its base, the Q1 side of the capacitor C1 will jump negatively this fixed amount and, since C1 is a capacitor, so will the Q2 side of C1, thereby turning Q2 hard off. Since the Q2 side of C1 has jumped negative, the emitter of Q2 will tend to be kept at a negative voltage which would prevent turning on the transistor Q2 when the next pulse $E_p$ is supplied to this multivibrator. In this fashion, if nothing more is done, the design of this invention would result in a multivibrator which will block itself and which would probably not even complete one cycle. It is thus essential to the success of this design to have some means for discharging the timing capacitor C1. Thus, the only way to achieve the benefits of placing the timing capacitor C1 across the low impedance output terminals of the transistors Q1 and Q2 is to include in the monostable multivibrator a technique for bringing the emitter of the transistor Q2 back to an appropriate re-firing voltage.

To bring the switch back to its firing point, the transistor Q3 is included as illustrated. As the switch switches back to its monostable state and the collector of Q1 rises positive (towards the ground) by substantially $E_m$ volts, the base of Q3, being coupled to the collector of Q2 through the Zener diode CR12, also rises positive by a like amount. The negative drop on both sides of the capacitor C1 that concurrently occurs is reflected at the emitter of the transistor Q3. Thus the transistor Q3 is turned hard on by the positive jump at its base and the negative jump at its emitter. Once Q3 is turned on, the diode CR11 conducts and the emitter of the transistor Q2 is pulled positive to almost the firing point. It might be noted that if R14 was zero, the emitter of Q2 would effectively be returned to exactly the firing point but that would tend to produce unstable operation and thus the small resistor R14 is included to provide stability. In this fashion a heavy current is pulsed from ground, through the capacitor C5, the transistor Q3, the diode CR11, the capacitor C1, the transistor Q1 and the diode CR7 to ground thereby discharging the capacitor C1 and thus brings the capacitor C1 almost to the level of starting. There is then sufficient time for the capacitor and switch to settle down to the starting point again.

The time it takes to switch back to the stable state is a function of the RC constant formed by the resistor R12 and the capacitor C1. It is also a function of the voltage level that is built up on the capacitor C1. Since, on triggering, the capacitor C1 jumps negative by approximately $E_m$ volts, any variation in the magnitude of the voltage supplied at the $E_m$ input will affect the time it takes to switch back to the stable state and thus will affect the output pulse width. In this fashion, the magnitude of the input $E_m$ voltage can be varied to duty cycle modulate the output pulses. The magnitude of the input $E_m$ voltage can be varied by the operator so that the operator can thereby tune the output, or, alternately, the $E_m$ input can be made to track with some parameter such as supply voltage or tape speed so as to modulate the output in a fashion to compensate for such variations. More broadly, the magnitude of $E_m$ can be varied as a function of any signal with which it is desired to duty cycle modulate the output $E_o$.

Since the timing elements are the capacitor C1 and the resistor R12, varying the magnitude of either of these elements will bring about tuning. The replacement of the capacitor C1 or the use of a variable capacitor will give a coarse tuning. Variation in the magnitude of the resistor R12 can be used to provide a finer tuning. Indeed, if the resistor R12 were a variable resistor whose magnitude changes as a function of some signal, then the variation of that resistor R12 would duty cycle modulate the output $E_o$ with that particular signal.

It is crucial to the operation of the circuit of this invention to recognize that the circuit will lock and just won't operate unless a means is provided, when the circuit returns to its stable state, to bring the emitter of the normally off transistor Q2 to a voltage sufficiently close to its base voltage so that it will turn on when the next triggering signal is applied to turn off the normally on transistor Q1. Thus, at the heart of this circuit is the recognition that a timing capacitor between the two emitters of the switching transistors in conjunction with a means for clearing the charge off of that timing capacitor after switching back to the stable state will provide the objectives above stated.

Figures 2, 3:
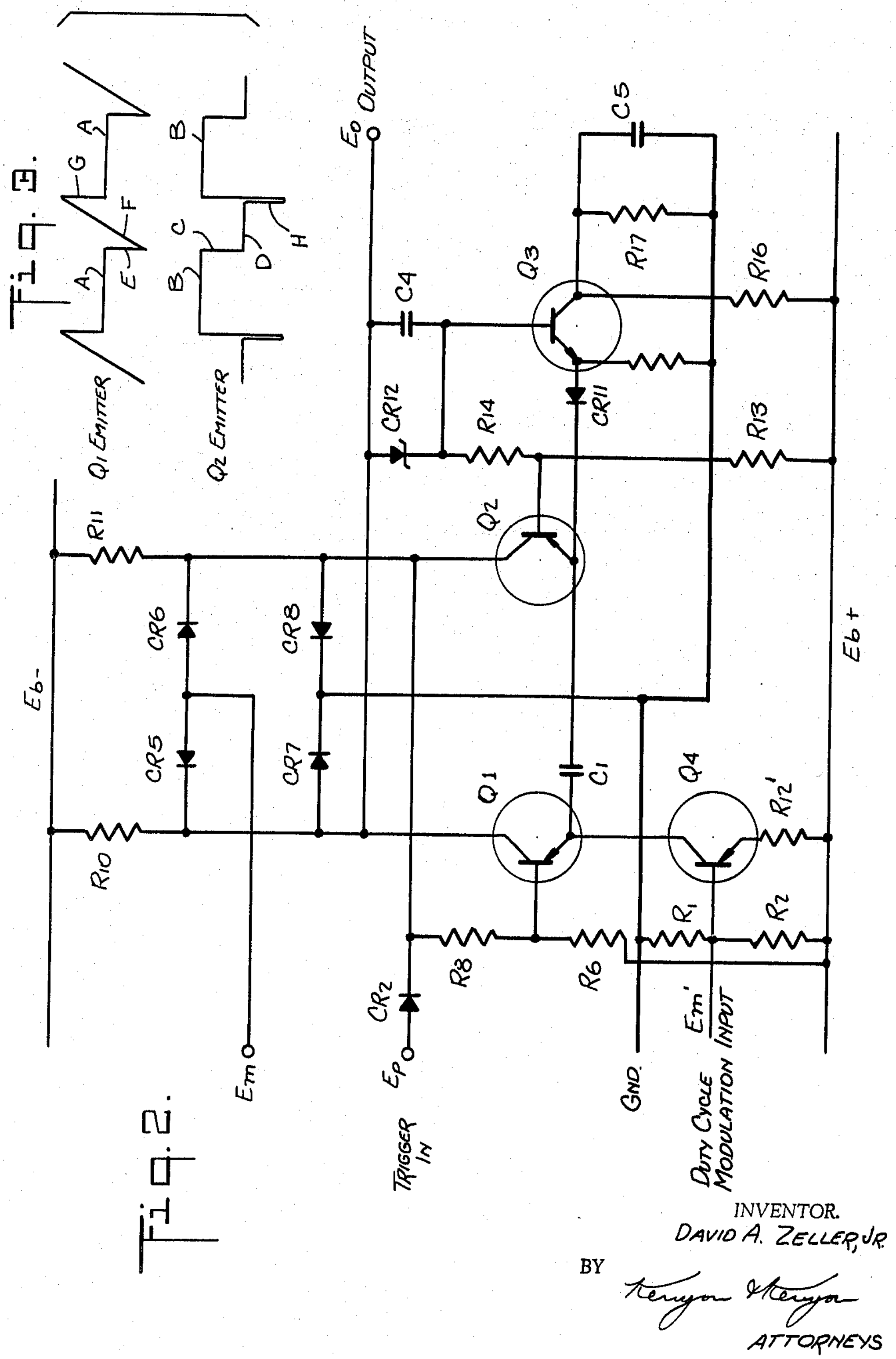
FIG. 2 is another embodiment of this invention similar to FIG. 1 except that it permits modulation of the output by two secondary input signals (that is by two signals other than the triggering signal)
FIG. 3 is a time diagram of the voltages on the emitters of the switching transistors in the above two embodiments.

With the above operation of the circuitry in mind, a more detailed description of what occurs at the emitters of the switching transistors Q1 and Q2 will give a complete picture of the operation of this invention. The voltage-time charts of FIG. 3 illustrate what occurs during operation of a monostable multivibrator circuit.

If we start with the circuit in its stable state, the transistor Q1 is on so that its emitter has a given voltage level A determined by the drop across the resistor R12. Concurrently the emitter of the normally off transistor Q2 is at a constant voltage level B which level must be set to be substantially close to the voltage at the base of the transistor Q2 so that the $E_m$ drop applied to the base of Q2 when the transistor Q1 turns off will serve to turn the transistor Q2 on. On switching to the unstable state, the base of Q2 drops by substantially $E_m$ volts, as described above, and since Q2 then turns on, its emitter must follow the base and accordingly the emitter of Q2 drops substantially $E_m$ volts, indicated by the reference C in FIG. 3. Since the base of Q2 is pegged while it is on, the emitter will remain pegged at the voltage level D during unstable operation.

When the emitter of Q2 drops the amount C as Q2 turns on, the emitter of the transistor Q1 drops a comparable amount because it is coupled to the emitter of Q2 through the timing capacitor C1 and the sharp drop is simply transmitted through the capacitor C1 to the emitter of Q1 to drop the emitter of Q1 by an amount E (which equals the amount C). With Q1 now off, current flows up through the timing resistor R12 to gradually charge up the left-hand side of the timing capacitor C1 and thus increase the voltage level on the emitter of G1 to form the ramp F illustrated in FIG. 2. This voltage increase on the emitter of Q1 proceeds until it is sufficient to turn on Q1. When Q1 turns on, its emitter drops by magnitude G to its stable "on" voltage A. And thus Q1, without more ado, returns to the stable state and has the appropriate voltages on its elements so that the next triggering signal will tend to turn it off.

However, a serious problem is posed by the fact that this drop of G volts on the emitter of Q1 is transmitted by the timing capacitor C1 to the emitter of Q2 to cause the emitter of Q2 to drop H volts. In order for this circuit to operate, it is necessary to return the emitter of Q2 to the voltage level B so that Q2 will switch on when the next triggering pulse $E_p$ is applied. To bring the emitter of Q2 back up to B volts in the stable state, it is necessary to dump the charge on the capacitor C1. For this purpose, the transistor Q3, operating as described above, is supplied. The transistor Q3 switches on when the rest of the circuit switches to its stable state. Thereby, the transistor Q3 supplies a pulse of current which wipes the charge off of C1 and concurrently causes Q3 to turn off so that the emitter of Q2 is returned to the B plateau and is ready for the next triggering pulse $E_p$. In this fashion the Q3 transistor stabilizes the capacitor C1 voltage during the stable state.

The 100 ohm resistor R14 causes the emitter and base of Q3, when on, to differ very slightly from the voltage level at the base of Q2 and thus the emitter of Q2 which is brought to the voltage level of the emitter and base of Q3 by the pulsing of Q3 is brought to a voltage level just slightly different than the base of Q2. This slight difference is simply to provide stability and prevent unwanted switching.

FIG. 2 illustrates a variation on the circuit of FIG. 1 in which the timing resistor R12 of FIG. 1 is replaced by a current source (the transistor Q4 and the resistor R12'). A further modulating input $E_m'$ is connected directly to the base of the transistor Q4. As the magnitude of $E_m'$ changes, the magnitude of the current through the current source Q4 changes. Since the magnitude of the current through the current source Q4 determines the rate at which the timing capacitor C1 will build up a positive voltage sufficient to cause the transistor Q1 to switch on and thereby achieve the monostable state, any variation in this current through this current source Q4 will be reflected as a modification in the width of the output pulses $E_o$. In this fashion, variations in the input signal $E_m'$ will result in duty cycle modulating the output $E_o$.

As in FIG. 1, modification of the value of the timing capacitor C1 will result in coarse tuning and modification of a value of the emitter resistor R12' will result in finer tuning.

The FIG. 2 embodiment illustrates a three input monostable multivibrator in which a triggering series of pulses $E_p$ is used to determine the pulse repetition rate of the output series of pulses $E_o$ and to cause the monostable operation. Ignoring the secondary inputs $E_m$ and $E_m'$, this monostable multivibrator can be used as a pulse averaging discriminator which converts information carried by the pulse repetition rate of the triggering input train of pulses $E_p$ into a D.C. magnitude determined by the averaging of the output train of pulses $E_o$. If this information is being picked off of tape, a tape speed error signal may be applied at the secondary input $E_m$ to cause duty cycle modulation of the output $E_o$ so as to compensate for tape speed variations. A second error signal could be developed to represent variations in power supply voltage and that error signal could be applied to cause variations in the secondary input signal $E_m'$ so as to further duty cycle modulate the output train of pulses $E_o$ and thereby compensate for variations in the supply voltage.

Although an embodiment of this invention has been described in some detail, it is to be understood that the invention may take the many embodiments which will be obvious to those skilled in this art.

For example, the invention may be adapted to a vacuum tube monostable multivibrator, in which case the timing capacitor would be connected between the cathodes of the two switching tubes.

Furthermore, the particular method of dumping the charge on the timing capacitor may be varied. What is important is to recognize the need for some means to return the emitters (or cathodes) to the refiring voltage as rapidly as possible to avoid locking up the switch.

What is claimed is:

1. A monostable multivibrator having a stable state and an unstable state, comprising:

a first switching valve and a second switching valve, each of said valves having a high impedance output element, a low impedance output element and a control element, the high impedance output element of each of said valves being coupled to the control element of the other one of said valves, said valves being intercoupled so that said first valve is on and said second valve is off during said stable state and so that said first valve is off and said second valve is on during said unstable state of said multivibrator, a timing capacitor connected between said low impedance output elements of said switching valves, pulsing means for providing a pulse of current to bring the charge of said capacitor to a pre-determined value when said multivibrator reverts to said stable state, and means to couple said pulsing means to one of said output elements of one of said switching valves so that the change of state of said one of said output elements indicating a switch of said multivibrator from said unstable state to said stable state will cause said pulsing means to provide said pulse of current.

2. The monostable multivibrator of claim 1 further characterized by:

a first input circuit coupled to said control element of said first valve to cause a change in the state of said first valve when subject to an input voltage of a predetermined magnitude, a second input circuit coupled to said high impedance output elements of said switching valves to clamp the voltage swing on said high impedance elements at whatever voltage magnitude is applied to said second input circuit, whereby variations in the voltage supplied to said second input circuit will cause variations in the voltage at which said high impedance elements are clamped and thereby modify the output pulse width, and a third input circuit, including a timing resistor in series with a current source, connected to said timing capacitor, whereby variations in the voltage supplied to said third input circuit will cause variations in the current supplied by said current source and thereby modify the charging time of said timing capacitor and accordingly modify the width of the output pulses.

3. A monostable multivibrator having a stable state and an unstable state, comprising:

a first switching valve and a second switching valve, each of said valves having a high impedance output element, a low impedance output element and a control element, the high impedance output element of each of said valves being coupled to the control element of the other one of said valves, said valves being intercoupled so that said first valve is on and said second valve is off during said stable state and so that said first valve is off and said second valve is on during said unstable state of said multivibrator, a timing capacitor connected between said low impedance output elements of said switching valves, dumping means to discharge said timing capacitor to a charge level of a predetermined value in a time period that is significantly less than the time period of said unstable state of said monostable multivibrator, coupling means coupling said dumping means to one of said output elements of one of said switching valves so that the change of state of said one of said output elements indicating a switch of said multivibrator from said unstable state to said stable state will cause said dumping means to become operative to effect said discharge of said timing capacitor.

4. The monostable multivibrator of claim 3 further characterized by:

a first input circuit coupled to said control element of said first valve to cause a change in the state of said first valve when subject to an input voltage of a predetermined magnitude, a second input circuit coupled to said high impedance output elements of said switching valves to clamp the voltage swing on said high impedance elements at whatever voltage magnitude is applied to said second input circuit, whereby variations in the voltage supplied to said second input circuit will cause variations in the voltage at which said high impedance elements are clamped and thereby modify the output pulse width, and a third input circuit, including a timing resistor in series with a current source, connected to said timing capacitor, whereby variations in the voltage supplied to said third input circuit will cause variations in the current supplied by said current source and thereby modify the charging time of said timing capacitor and accordingly modify the width of the output pulses.

5. A monostable multivibrator having a stable state and an unstable state, comprising:

a first switching valve and a second switching valve, each of said valves having a high impedance output element, a low impedance output element and a control element, the high impedance output element of each of said valves being coupled to the control element of the other one of said valves, said valves being intercoupled so that said first valve is on and said second valve is off during said stable state and so that said first valve is off and said second valve is on during said unstable state of said multivibrator, a timing capacitor connected between said low impedance output elements of said switching valves, and means for bringing the voltage on said low impedance element of said second switching valve to a predetermined refiring voltage when said multivibrator reverts to its stable state, said means including a third valve designed to provide a pulse of current and having its output coupled to said timing capacitor, the control element of said third valve being coupled to one of said output elements of one of said switching valves so that the change of state of said one of said output elements indicating a switch from said unstable state to said stable state will turn on said third valve to cause a current pulse to discharge said timing capacitor.

6. A monostable multivibrator having a stable state and an unstable state, comprising:

a first switching transistor and a second switching transistor, each of said transistors having a collector, an emitter and a base, the collectors of each of said transistors being coupled to the base of the other one of said transistors, said transistors being intercoupled so that said first transistor is on and said second transistor is off during said stable state and so that said first transistor is off and said second transistor is on during said unstable state of said multivibrator, a timing capacitor connected between said emitters of said switching transistors, and a pulse current source having its output connected to said timing capacitor, said pulse current source including a transistor having its base coupled to the output of one of said switching transistors whereby a change of state in said one of said switching transistors indicating a multivibrator switch from said unstable state to said stable state will serve to turn on said pulse current source thereby discharging said timing capacitor to the extent required to bring said timing capacitor and said emitter of said second transistor substantially to a predetermined refiring voltage.

7. The monostable multivibrator of claim 6 further characterized by:

a first input circuit coupled to the base of said first transistor to cause a change in the state of said first transistor when subject to an input voltage of a predetermined magnitude, a second input circuit coupled to the collectors of said transistors to clamp the voltage swing on said collectors at whatever voltage magnitude is applied to said second input circuit, whereby variations in the voltage supplied to said input circuit will cause variations in the voltage at which said collectors are clamped and thereby modify the output pulse width, and a third input circuit, including a timing resistor in series with a current source, connected to said timing capacitor, whereby variations in the voltage supplied to said third input circuit will cause variations in the current supplied by said current source and thereby modify the charging time of said timing capacitor and accordingly modify the width of the output pulses.

References Cited by the Examiner

UNITED STATES PATENTS

| | | | |
|---|---|---|---|
| 2,750,502 | 6/1956 | Gray | 328—63 |
| 2,764,677 | 9/1956 | Graham | 328—207 |
| 2,942,207 | 6/1960 | Dunwoodie et al. | 328—203 |
| 3,037,172 | 5/1962 | Biard | 332—14 |
| 3,061,799 | 10/1962 | Biard | 307—88.5 |
| 3,061,800 | 10/1962 | Matzen | 307—88.5 |
| 3,076,152 | 1/1963 | Biard et al. | 307—88.5 |

OTHER REFERENCES

"Basic Theory and Application of Transistors," Dept. of the Army Technical Manual, TM 11–690, page 209, FIG. 203 relied on.

ARTHUR GAUSS, *Primary Examiner.*

JOHN W. HUCKERT, *Examiner.*

R. H. EPSTEIN, *Assistant Examiner.*